United States Patent [19]
Tang et al.

[11] Patent Number: 5,476,161
[45] Date of Patent: Dec. 19, 1995

[54] SELF-ENERGIZING, SELF-LEVELLING CONTROLLABLE DAMPER UNIT FOR A VEHICLE SUSPENSION

[75] Inventors: Jing S. Tang, Derby; Brian B. Hall, Hepworth, both of United Kingdom

[73] Assignee: University of Huddersfield Higher Education Corporation, Huddersfield, United Kingdom

[21] Appl. No.: 363,209

[22] Filed: Dec. 22, 1994

Related U.S. Application Data

[63] Continuation of Ser. No. 975,590, filed as PCT/GB91/01160 Jul. 12, 1991, abandoned.

[30] Foreign Application Priority Data

Jul. 24, 1990 [GB] United Kingdom .................. 9016203

[51] Int. Cl.$^6$ .............................. B60G 17/08; F16F 9/06
[52] U.S. Cl. .......................... 188/299; 188/269; 188/298; 188/315; 267/64.17
[58] Field of Search ........................ 267/DIG. 1, DIG. 2, 267/64.17, 64.19, 64.27, 64.28, 113, 118, 120, 218, 217; 188/299, 280, 285, 314, 315, 319, 317, 318, 322.13, 269, 297, 298; 280/707, 714

[56] References Cited

U.S. PATENT DOCUMENTS

| | | | |
|---|---|---|---|
| 2,946,582 | 7/1960 | Martin .............................. | 267/DIG. 2 |
| 4,469,315 | 9/1984 | Nicholls et al. ..................... | 188/299 |
| 4,720,085 | 1/1988 | Shinbori et al. ..................... | 267/64.16 |
| 4,896,752 | 1/1990 | Shtarkman ............................ | 188/315 |
| 4,974,707 | 12/1990 | Neumann et al. ...................... | 188/299 |
| 4,993,693 | 2/1991 | Löhr et al. .......................... | 267/64.17 |

FOREIGN PATENT DOCUMENTS

| | | |
|---|---|---|
| 0318817 | 11/1988 | European Pat. Off. . |
| 0351537 | 6/1989 | European Pat. Off. . |
| 0389828 | 3/1990 | European Pat. Off. . |
| 2552513 | 9/1984 | France . |
| 2562843 | 10/1985 | France . |
| 1655983 | 7/1971 | Germany ............................ 267/64.17 |
| 0034809 | 2/1987 | Japan ..................................... 188/315 |
| 727574 | 4/1955 | United Kingdom . |
| 2053105 | 2/1981 | United Kingdom ................ 267/64.17 |
| 2132313 | 7/1984 | United Kingdom . |

*Primary Examiner*—Matthew C. Graham
*Attorney, Agent, or Firm*—Harrison & Egbert

[57] ABSTRACT

A self-energizing self-levelling controllable damper unit is provided for use in a vehicle suspension system connected between two relatively movable portions of the system. The unit includes a piston and cylinder arrangement containing a damping fluid and defining three chambers of variable volume dependent upon the relative positions of the components of the arrangement. A valve is provided to regulate the flow of the damping fluid between the first and the second chambers, and between the second and third chambers respectively. The valve is controlled by a controller which, as the vehicle drives over a road surface, controls relative movement of the components of the piston and cylinder arrangement by permitting the damping fluid to flow from the third chamber to the second chamber and thence to the first chamber, and vice versa, until a desired ride height of the vehicle is achieved. The controller causes the valve to operate to prevent the flow of the damping fluid between at last the first chamber and the second chamber, and to control the movement of fluid between the second chamber and the third chamber thereby damping the relative movement of the components of the suspension system as the vehicle proceeds over the road surface.

9 Claims, 3 Drawing Sheets

SELF-ENERGIZING, SELF-LEVELLING CONTROLLABLE DAMPER UNIT FOR A VEHICLE SUSPENSION

This is a continuation of application Ser. No. 07/975,590 filed as PCT/GB91/01160 Jul. 12, 1991, now abandoned.

TECHNICAL FIELD

The present invention relates to a damper unit for use in a vehicle suspension and in particular to a self-levelling damper unit for use in a semi-active vehicle suspension arrangement.

BACKGROUND ART

Conventional passive vehicle suspensions are not capable of adjusting to the wide range of dynamic conditions which they meet in practice. These conditions include varying road profiles, vehicle speeds and handling conditions. It means that optimum performance of passive suspensions is necessarily limited to one type of road profile and vehicle speed condition.

On the other hand, fully active suspensions, which exploit the developments of microprocessors, transducers and optimal control theory, are capable of maintaining optimum performance over a wide range of operating conditions. Adjustments to the suspension forces can be made by actuators which receive signals via a microprocessor from a range of transducers attached to the vehicle.

Semi-active vehicle suspensions have been developed as viable alternatives to fully active suspensions, which are expensive in terms of hardware and require significant amounts of power in operation. It has been shown that the optimal performance achievable with fully active systems can be approached with well designed semi-active systems. These systems normally incorporate transducers to monitor suspension positions and velocities together with controllable dampers whose settings are adjusted by a microprocessor.

Whereas fully active systems are able to supply energy to the suspension, semi-active systems are not. When there is a demand for power to be put into the suspension (as determined by the controller), semi-active systems switch to a notional zero damping state. At other times in their operation there is a need to dissipate energy and this is achieved by switching the dampers to two or more settings, or more desirably, adjusting them continuously to meet the needs of the controller. Currently, a number of manufacturers have developed switchable damper systems and developments are known to be underway on continuously variable dampers.

In general, the performance of semi-active systems is compromised by changes in vehicle payload. In effect, as payload on the vehicle is increased, the suspension working space is reduced, leading to a reduction in performance. This problem can be overcome by combining with controllable dampers, a self-leveling system which maintains the design working-space. Most existing self-levelling designs are hydropneumatic systems which require additional hardware such as a hydraulic pump.

It is an object of the present invention to provide a self-levelling damper unit for a semi-active vehicle suspension which is self energizing.

SUMMARY OF THE INVENTION

According to the present invention there is provided a self-energizing self-levelling damper unit for use in a vehicle suspension system comprising a piston and cylinder arrangement for connection between two relatively movable portions of the system, said piston and cylinder arrangement containing a damping fluid three chambers of variable volume dependent upon the relative positions of the components of the arrangement, a gas reservoir to which the internal pressure of one of the chambers is communicated and varies of volume to compensate for the difference in the total volume of the piston and cylinder arrangement as the components of the arrangement move relative to one another, a second gas reservoir to which the internal pressure of another of the chambers is communicated, valve means to regulate the flow of the damping fluid between the first and the second chambers and between the second and third chambers, and control means for the valve means, to permit the damping fluid to flow in a controlled manner from the third chamber to the second chamber and thence to the first chamber and vice versa on relative movement of the components of the piston and cylinder arrangement, until an optimum position is reached, and thereafter operate to prevent the flow of the damping fluid between at least the first chamber and the second chamber and to control the movement of fluid between the second chamber and the third chamber to damp said relative movement of the portions of the system.

Preferably also, the valve means comprises two independently operable valves to control the flow of the damping fluid between the first and the second chambers and between the second and the third chambers respectively.

Preferably also, a check valve is provided to operate with the first valve to prevent the flow of the damping fluid from the first chamber to the second chamber when the pressure in the second chamber is lower than the pressure in the first chamber.

Preferably also, the first the flow of damping fluid between the first and the second chambers comprises a fully openable valve. This valve is preferably controllable to permit fluid flow either in one direction only or the opposite direction only, or can be closed to prevent fluid flow therethrough.

Preferably also, the valve controlling the flow of damping fluid between the second and the third chambers comprises a valve which can either be fully opened to permit fluid flow in one direction or variably partially opened to control the rate of fluid flow in the other direction. This valve preferably comprises a continuously variable-rate damping valve.

Preferably also, the control means comprises means to measure the pressure of the damping fluid within at least two of the chambers and means to monitor the relative movement of the components of the piston and cylinder arrangement.

It will be appreciated that in the present invention, when payload is added to the vehicle, self levelling is achieved by the self-energized pumping action provided by the ground profile. This causes relative movement across the suspension arrangement which increases the pressure in a gas reservoir. Thus, in a short distance of travel (depending on the degree of roughness of the ground surface), the working space is restored to its design value. Computer simulations predict that on an average road in the UK, this self-levelling process will take approximately three seconds for a payload/vehicle mass ratio of 0.14 and a vehicle speed of 54 km/h. On relatively smooth ground surfaces, where self-levelling takes longer, there is no serious disadvantage since the levels of vibration induced in the vehicle are relatively low.

It is proposed that the self-energizing self-levelling (SESL) damper unit of the invention is used in conjunction with a pair of controllable valves, one a fully-open fully-closed type, the other a continuously variable-rate damping valve. These valves may be either internal or external to the SESL unit.

BRIEF DESCRIPTION OF THE DRAWINGS

A specific embodiment of the invention will now be described by way of an example with reference to the drawings in which.

DETAILED DESCRIPTION OF THE INVENTION

Figure 1:
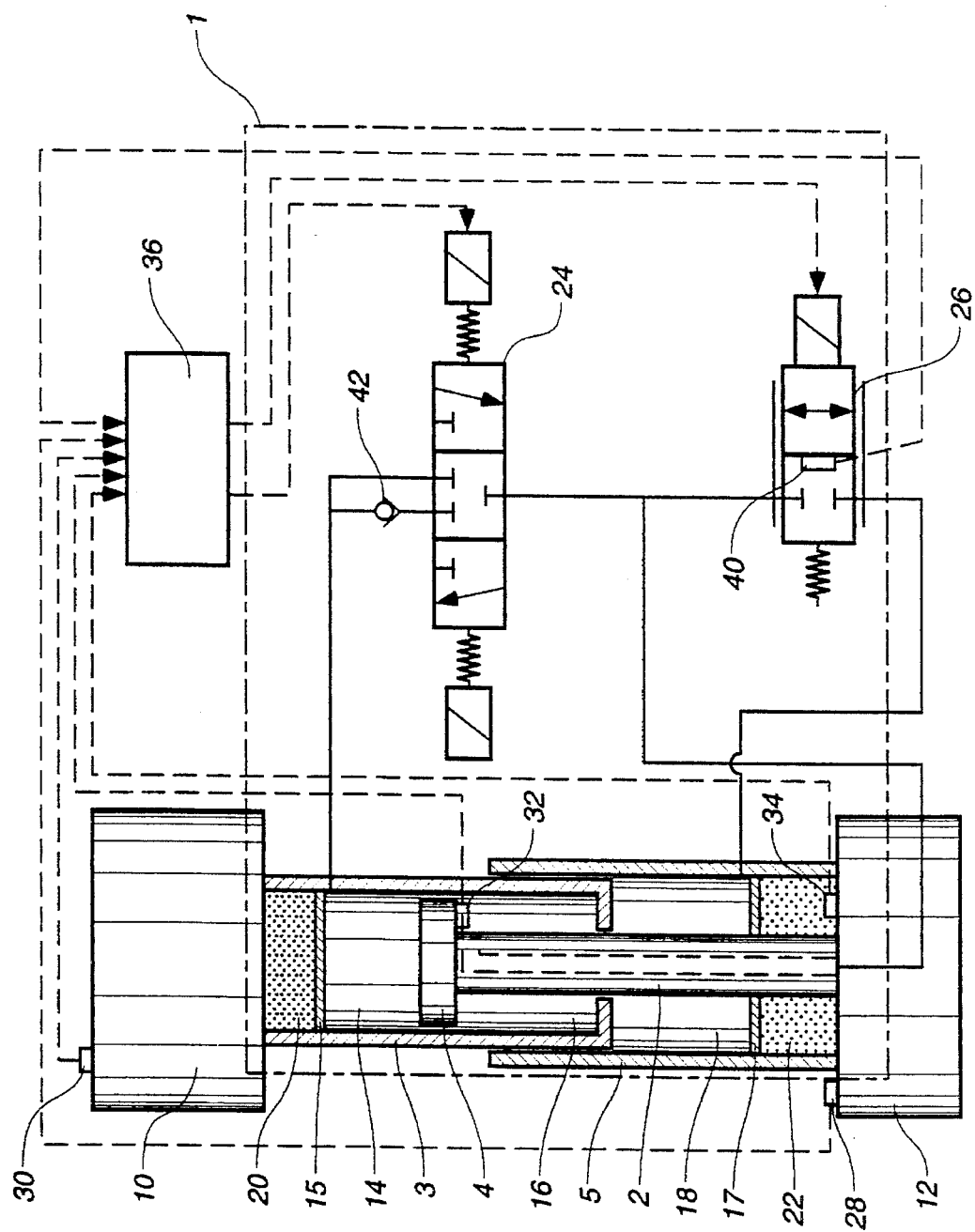
FIG. 1 shows a damper unit according to the invention located at one wheel station of a vehicle.

The suspension layout and instrumentation shown in FIG. 1 are intended to put the damper unit of the invention into context. While accelerometers and a microprocessor are common features of other known semiactive suspensions, the combination of a SESL unit (with pressure transducers) and a continuously variable-rate damper are not.

As shown in FIG. 1, a damper unit 1 according to the invention comprises a piston and cylinder arrangement wherein a piston 2 can move longitudinally within a first cylinder 3 and thereby define two chambers 14 and 16 of variable volume in the cylinder 3 on either side of the piston head 4. The cylinder 3 is itself partially enclosed by a second cylinder 5 within which it can also move longitudinally in the manner of a piston to define a third chamber 18. Each of the chambers 14, 16 and 18 is filled with an hydraulic damping fluid.

When forming part of a vehicle suspension arrangement as shown diagrammatically in FIG. 1, the damper unit 1 is located between a sprung mass 10 and an un-sprung mass 12. The sprung mass can be considered to be a proportion of a vehicle body mass, while the un-sprung mass represents the mass of a single wheel and axle.

The chambers 14 and 18 also define gas reservoirs 20 and 22 each separated from the hydraulic fluid in the chambers by elastic diaphragms 15 and 17, or in a modified arrangement by pistons. Alternatively to reduce the overall height of the unit, these gas reservoirs may be located externally of the cylinders 14 and 18. The volume of the gas reservoirs 20 and 22 shrinks or expands depending upon the internal pressure of the chambers 14 and 18 respectively. The upper reservoir 20 is provided to act as a gas spring for the damper unit when self-leveling of the unit has been achieved. It therefore acts to assist in the control of the relative movement of the masses 10 and 12. The lower reservoir 22 is essentially provided to compensate for the difference in the total volume of the chambers 16 and 18 as the cylinder 3 moves within the second cylinder 5. This volume difference is related to the thickness of the chamber wall of the cylinder 3.

The flow of fluid between chambers 14 and 16 is controlled by a valve 24 and between the chambers 16 and 18 by a valve 26. These valves 24,26 are themselves controlled by signals from two accelerometers 28 and 30 and two pressure transducers 32 and 34 via a microprocessor 36. The accelerometers 28 and 30 are located respectively on the un-sprung mass 12 and the sprung mass 10 and can detect the change in the acceleration of these masses 10,12 as the vehicle moves. The pressure transducers 32 and 34 are located respectively within the chamber 16 and the chamber 18 or the gas reservoir 22 and detect the pressure within these chambers. The microprocessor 36 processes the information received from the accelerometers 28,30 and the transducers 32,34 and controls the operation of the valves 24 and 26 in accordance therewith as will be described.

Also connected to the microprocessor 36 is a third accelerometer 40, which is located within the valve 26, and measures the acceleration of the valve closure member to give information on the velocity and displacement of the closure member. This information is used by the microprocessor 36 to control the operation of the valve 26 and thereby control the damping effect produced by the valve 26 as will also be described.

The valve 24 is a solenoid operated spring return three position, three connection directional control valve. Essentially, this means that it can permit the flow of fluid through it in both directions either in a first valve position from chamber 14 to chamber 16 or vice versa when in a second valve position. In addition, in a third valve position it is closed to prevent fluid flow in either direction.

A third valve 42, comprising a check valve, is also located in the fluid line between the chamber 14 and the valve 24. In the first position of the valve 24, wherein fluid can flow from the chamber 14 to the chamber 16, the check valve 42 is bypassed. However, in the second position of the valve 24 wherein fluid can flow from the chamber 16 to the chamber 14, the check valve is not bypassed and acts to prevent this flow if the pressure in the chamber 16 is less than that in the chamber 14.

The valve 26 is a solenoid operated spring return proportional valve which can be controlled to permit free flow of fluid from the chamber 18 to the chamber 16 but only a restricted flow in the opposite direction during self-leveling. The microprocessor 36 controls the operation of the valve 26 using the information from the transducers 32,34 so that the valve 26 is fully open when the pressure in the chamber 18 is higher than that in the chamber 16 to permit free flow of fluid from the chamber 18 to the chamber 16 but only partially open otherwise so that the fluid flow from the chamber 16 back to the chamber 18 is restricted to a greater or lesser degree dependent upon the degree of opening of the valve 26.

Turning now to the operation of the damper unit, in FIGS. 2(a) to 2(c) and 3(a) to 3(c) internal valving is shown in order to simplify the illustrations. In addition, the microprocessor 36 and the transducers 32 and 34 are omitted from these diagrams for simplicity. The mode of operation of the damper unit 1 is one of self-levelling followed by operation as a semi-active suspension. In the former the unit 1 acts as a variable spring and a two stage damper whereas in the latter the unit 1 acts as a constant spring and a variable damper.

Figure 2A:
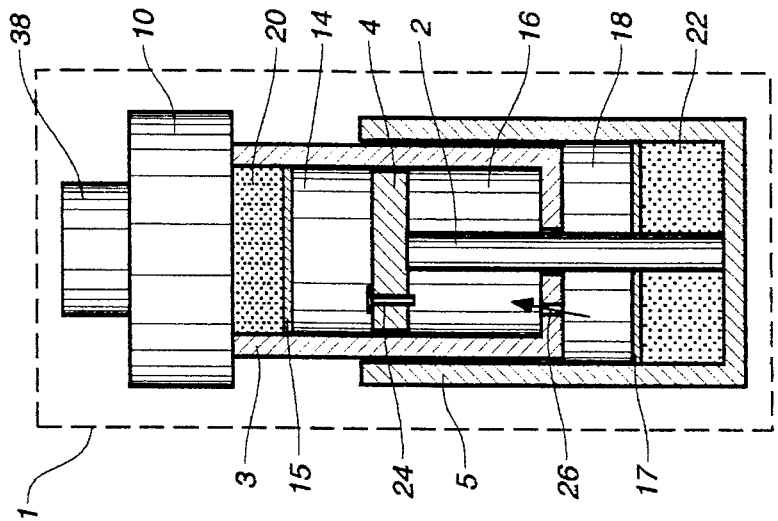
FIGS. 2(a), 2(b) and 2(c) show diagrammatically three stages in the self-levelling process of a damper unit as shown FIG. 1 arising from the addition of payload to the vehicle.
Figure 2B:
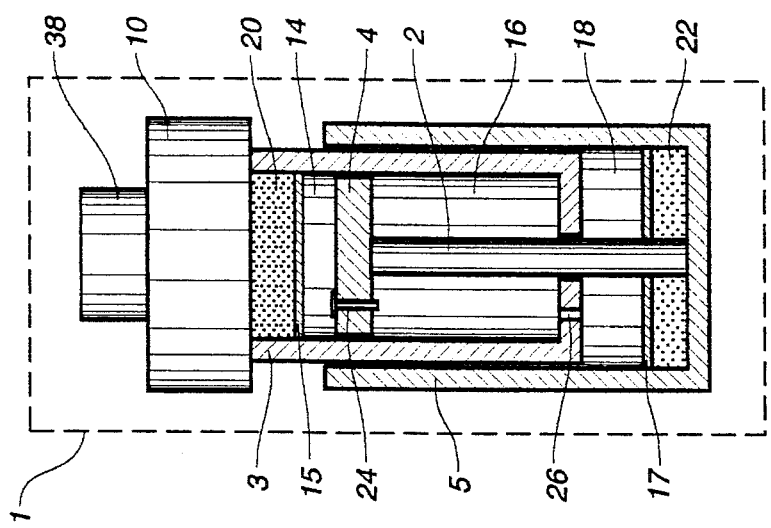
Figure 2C:
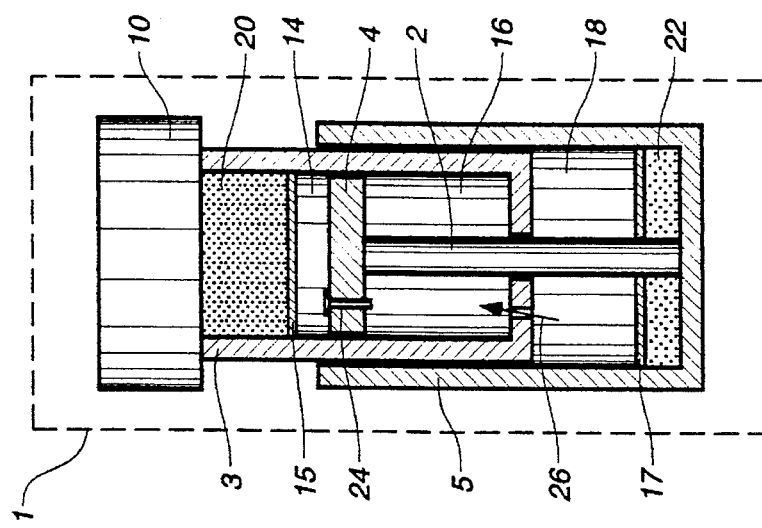
Figure 3A:
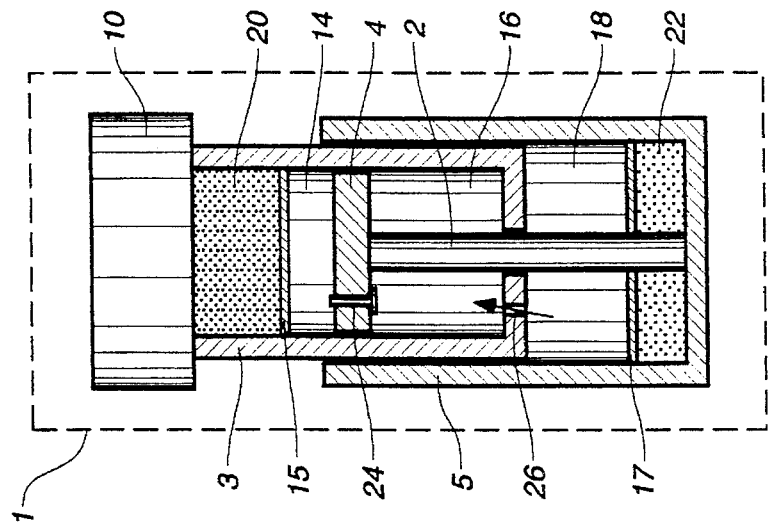
FIGS. 3(a), 3(b) and 3(c) show diagrammatically three stages in the self-leveling process of a damper unit as shown in FIG. 1 arising from the removal of payload from the vehicle.
Figure 3B:
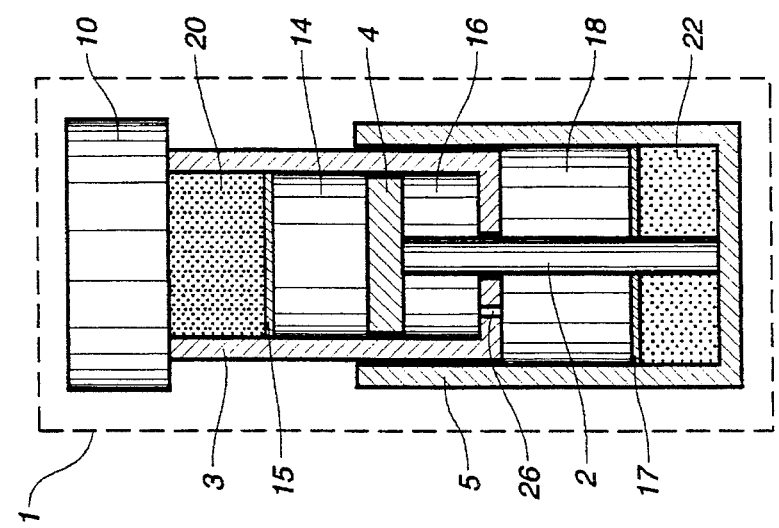
Figure 3C:
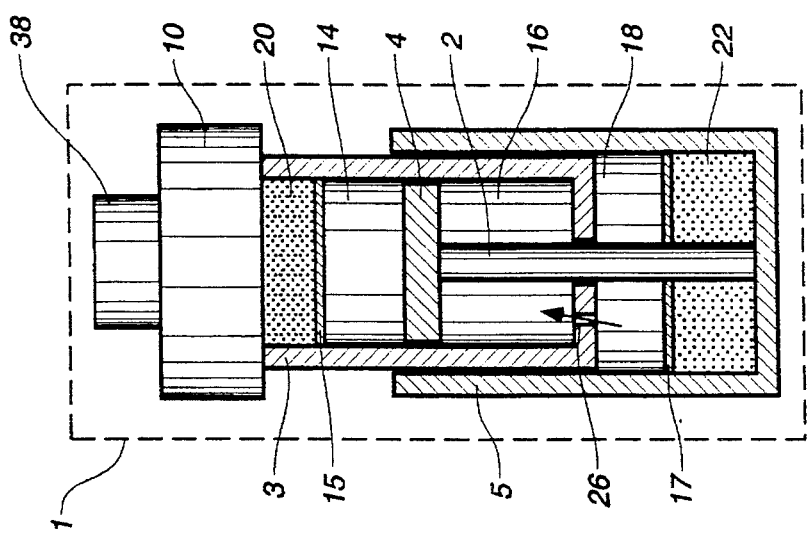

FIGS. 2(a) to 2(c) show three stages in the self-levelling process of the damper unit 1 after the vehicle has been loaded with a payload, which is shown diagrammatically as the weight 38. In contrast, FIGS. 3(a) to 3(c) show the self-leveling process after the payload 38 has been removed.

The valves 24 and 26 shown in FIG. 1 are represented in FIGS. 2(a),2(b) and 2(c) for simplicity as internal to the unit 1. In FIG. 2(b) the payload 38 has been added to the existing sprung mass, shown in FIG. 2(a), while the vehicle is stationary. At the time the payload 38 is added, the valve 26 is fully open and the pressures in chambers 16 and 18 are equal. The valve 24 is then closed under pressure and the air in reservoir 20 is compressed. The result is a downward deflection of the payload 38 and body masses. When the vehicle begins to move, FIG. 2(c), the SESL unit 1 is energised by the input from the ground surface, the valve 24 is then operated as a non-return valve and the operation of the valve 26 is controlled. The latter is kept fully open when the volume of the chamber 16 is increasing, otherwise it is only partially opened to produce damping and hence control vibration. The relative motion across the SESL unit 1 pumps fluid from chamber 18 through chamber 16 into chamber 14, gradually lifting the vehicle body to the desired mean position.

Thus in the position shown in FIG. 2(b), the valve 24 is controlled by the microprocessor 36 and placed in its second position so that it permits fluid flow from the chamber 16 to the chamber 14 when the pressure in chamber 16 is higher than that in the chamber 14. In this way, the input from the ground surface acts as a pump to increase the volume of the chamber 14 and thereby lifts the vehicle. In contrast, the valve 26 is controlled so that when the pressure in the chamber 18 is higher than that in the chamber 16 it is fully open to permit free flow of fluid from chamber 18 into chamber 16. However, when pressure in the chamber 18 is not higher than that in the chamber 16, the flow of fluid through the valve 26 back from chamber 16 into chamber 18 is restricted. This is beneficial in reducing the vibration level of the sprung mass 10.

As shown in FIG. 2(c), when the desired suspension position of the damper unit 1 is detected by the microprocessor 36 from the information it receives from the accelerometers 28 and 30, then the valve 24 is placed in its third position so that it is closed to fluid flow in both directions between the chambers 14 and 16. The opening and closing of the valve 26 is then controlled by the microprocessor 36 using the information received from the accelerometers 28,30 and the transducers 32,34,40 according to a predetermined control strategy in order to achieve a near optimal performance of the suspension system. Hence, the damper unit 1 permits the suspension arrangement to operate as a semi-active suspension in which the movement of the fluid between the chambers 16 and 18 is controlled by the valve 26 which acts as a controllable damper. The upper gas reservoir 20 also assists in the damping process once the self-levelling position has been reached.

FIGS. 3(a) to 3(c) show the reverse situation when the payload is off-loaded from the vehicle. FIG. 3(a) shows the best position of the damper unit 1 when the vehicle contains the payload 38. When the payload 38 is removed from the stationary vehicle as shown in FIG. 3(b), the valve 26 is fully opened and the pressure in the chambers 16 and 18 causes the gas reservoir 20 to expand to lift the sprung mass 10 above its desired position as shown on FIG. 3(b). Valve 24 is then opened into its first position permitting fluid to flow from the chamber 14 to the chamber 16 and valve 26 is also fully opened to permit fluid to flow from the chamber 16 to the chamber 18 until the fluid pressures are preferably equalized and the vehicle body has returned to its desired position as shown in FIG. 3(c). Alternatively, valves 24 and 26 could both be opened simultaneously with the removal of the payload 38. This allows the vehicle body to remain at the desired height as the pressure in chamber 14 falls and fluid is transferred back to chamber 18 via chamber 16.

The damper unit of the invention may also be operated as a passive SESL suspension. In this case, valve 26 needs to be replaced by a pair of (passive) spring loaded one-way valves arranged to control the flow of fluid between chambers 16 and 18. The asymmetric damping characteristics required of passive suspensions can be obtained with valves having different pre-loads and stiffnesses. The transducers 32, 34, 40 and the microprocessor 36 are, of course, not required in this case.

We claim:

1. A self-energizing self-levelling damper unit for use in a vehicle suspension system comprising:

a piston and cylinder arrangement for connection between two relatively movable portions of the system, said piston and cylinder arrangement containing a damping fluid and defining two piston members and three chambers of variable volume dependent upon the relative positions of the piston members within the chambers of the arrangement;

a first gas reservoir to which an internal pressure of one of said chambers is communicated and which varies in volume to compensate for a difference in the volume of the piston and cylinder arrangement as the components of the arrangement move relative to one another;

a second gas reservoir to which an internal pressure of another of said chambers is communicated;

valve means for regulating a flow of the damping fluid between a first chamber and a second chamber and between a second chamber and a third chamber, said first, second and third chambers being said three chambers of variable volume; and control means connected to said valve means to permit the damping fluid to flow in a closed loop from the third chamber to the second chamber and thence to the first chamber and vice versa on relative movement of the components of the piston and cylinder arrangement until a desired position is reached, and said control means for preventing the flow of the damping fluid in said closed loop between at least said first chamber and said second chamber and for controlling the movement of fluid between said second chamber and said third chamber for continuously variable damping of said relative movement of the portions of the system.

2. The damper unit as claimed in claim 1, said valve means comprising first and second independently operable valves for controlling the flow of the damping fluid between the first and second chambers, and between the second and the third chambers.

3. The damper unit as claimed in claim 2, said first valve being controllable to permit fluid flow either in one direction only or in the opposite direction only, said first valve being closeable for preventing fluid flow therethrough.

4. The damper unit as claimed in claim 2 further comprising:

a check valve means operatively connected to the first valve for preventing the flow of the damping fluid from the first chamber to the second chamber when a pressure in the second chamber is lower than a pressure in the first chamber.

5. The damper unit as claimed in claim 2, said second valve moveable between a first position for permitting fluid flow in one direction and a second position for controlling a rate of fluid flow in the other direction.

6. The damper unit as claimed in claim 2, said second valve being a continuously variable-rate damping valve.

7. The damper unit as claimed in claim 2, said control means comprising:
   a first means located within the second valve for monitoring a velocity and displacement of a closure member of the second valve.

8. The damper unit as claimed in claim 7, said control means comprising:
   a second means for monitoring a pressure of the damping fluid within at least two of the chambers.

9. The damper unit as claimed in claim 8, said control means comprising:
   a third means for monitoring the relative movement of the components of the piston and cylinder arrangement.

* * * * *